Nov. 24, 1931.  V. DE VEZINO  1,833,280
AIR VEHICLE AEROPLANE
Filed Jan. 30, 1928  2 Sheets-Sheet 1
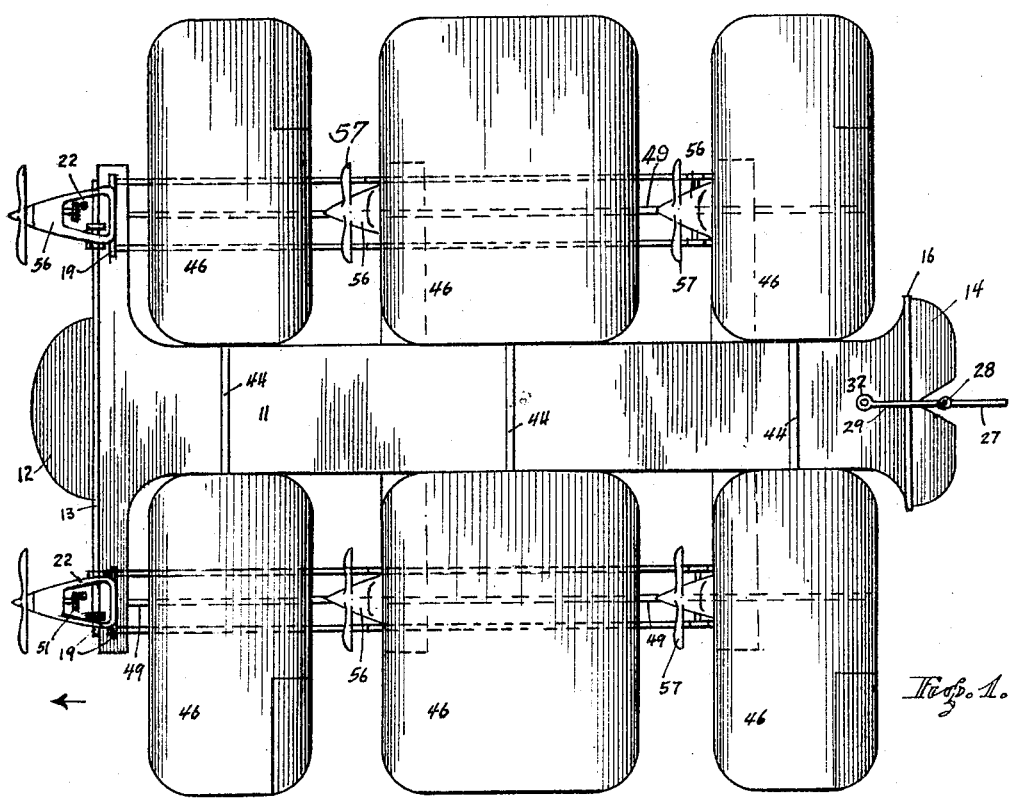
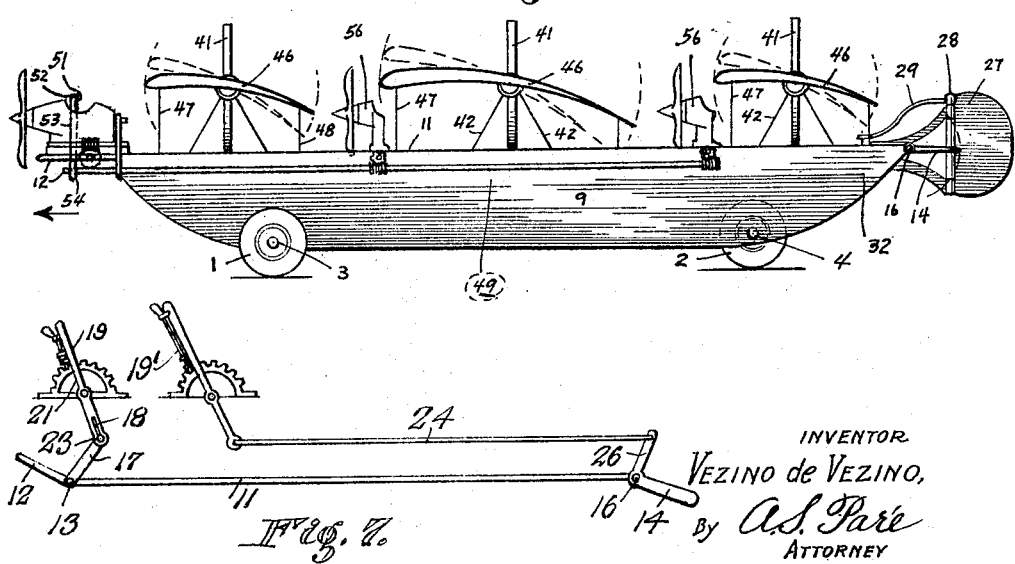
INVENTOR.
VEZINO de VEZINO,
By A.S. Paré
ATTORNEY

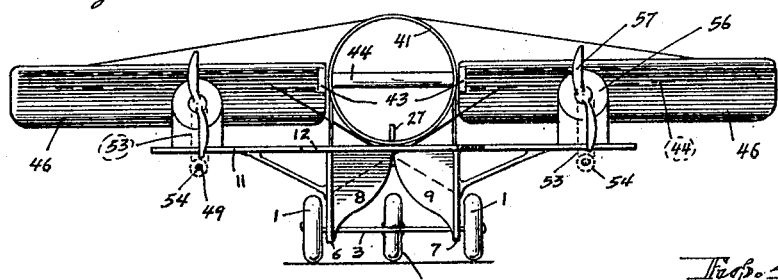
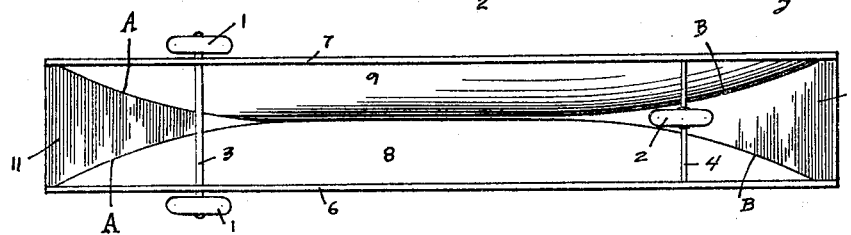
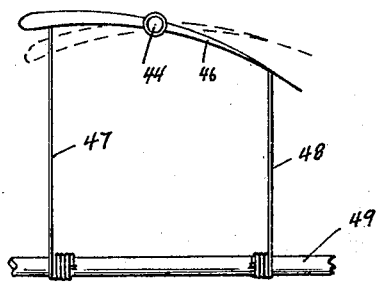
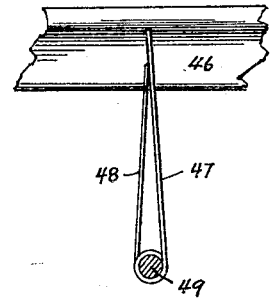
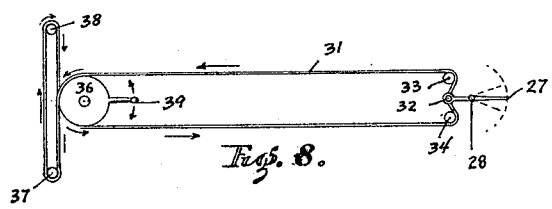

Patented Nov. 24, 1931

1,833,280

UNITED STATES PATENT OFFICE

VEZINO DE VEZINO, OF SAN FRANCISCO, CALIFORNIA

AIR VEHICLE AEROPLANE

Application filed January 30, 1928. Serial No. 250,612.

The present invention is an improved aeroplane and relates to the larger class of air vehicles employing several engines and designed for the transportation of passengers.

The principal object of the present invention is the provision of an aeroplane provided with a plurality of wings, preferably disposed in tandem relation and extending on opposite sides of the fuselage or passenger deck, each of the wings being provided with a pivotal movement allowing an adjustment thereof to various angular positions relative to the horizontal plane of the passenger deck. The planes are provided with a common control by means of which a pilot may change the angular position of all of the planes at will for the purpose of maneuvering the wings to the most advantageous position to effect either speed in transit, elevation of the vehicle in the air, or a brake in the case of landing.

Another object is the provision of a hull or under slung body provided with a V-shaped groove after the manner of a sea-sled. The structure hereinafter described lends itself readily to use either as a seaplane or a landing vehicle by the addition of a landing gear.

When used as a seaplane, the sea sled hull serves a two fold purpose. The peculiar contour and streamline construction of the hull offers a minimum resistance in taking off from the surface of the water, and yet it has the opposite effect and serves as an efficient brake when the vehicle lands in the water. Again the body, which is hollow, may be employed either as a fuel tank or as a tank for buoying up the vehicle when at rest in the water.

Other objects and advantages will appear as the specification proceeds, and the novel features of my invention will be particularly pointed out in the appended claims.

My invention is illustrated in the accompanying drawings forming a part of this application, in which:

Figure 1 is a top plan view of my invention,

Figure 2 is a side elevation thereof,

Figure 3 is a front elevation,

Figure 4 is a bottom plan view of the landing gear with the wings and other rigging removed, Figure 5 is a fragmentary view illustrating the method of changing the angularity of the planes.

Figure 6 is an end view of Figure 5,

Figure 7 is a diagrammatic view illustrating the method of controlling the elevators for the purpose of keeping the ship on a level keel, and Figure 8 is a diagrammatic plan for a three point control of the steering rudder.

Referring to the drawings, the numeral 1 indicates the front wheels and 2 the rear wheel of a landing gear, the wheels being journaled respectively on axles 3 and 4, the latter extending through keel members 6 and 7 of a sea sled composed of pontoons 8 and 9. These members are fashioned with a shape approximately one-half of an ordinary whale boat, assuming that the whale boat is severed along its longitudinal axis, and the two sections closed up on the cutaway sides, and the sections placed side by side with the curved gunwales adjacent each other.

This structure is best illustrated in Figures 3 and 4 which show the sled structure in end elevation and bottom plan. This structure affords a long sweeping curve indicated in the drawings at A and B at the front and rear of the vehicle respectively. This long sweeping curve is the proper streamline and is designed to afford a minimum resistance in gliding over the surface of the water and in taking off when the front end of the plane is elevated.

Resting on the gunwales of the sea sled is a deck 11 to the front end of which is pivoted an elevator 12 as at 13. A similar elevator 14 is pivoted at 16 to the rear end of the deck 11, see Figure 7. When it is desired to elevate the plane, it is necessary to raise the elevator 12 and simultaneously depress the rear elevator 14. This is accomplished by means of the mechanism shown in Figure 7 in which a lever 17 is rigidly secured to the elevator 12, the lever being actuated by a bifurcated end 18 of a hand lever 19 pivoted at 21 to each of the aviator's cockpits 22. The bifurcated end of the hand lever engages a pin 23 that extends through an eye in the lever 17. A second lever 19' is connected to an arm 26 on the elevator 14 by means of a rod 24. It is apparent from this arrangement that the two elevators may be operated simultaneously in the same direction or in opposite directions.

When raising the ship, the forward elevator is slightly tilted up and the rear one tilted down, as shown in Figure 7. When lowering the ship, the front elevator is tilted down and the rear one tilted up. If both elevators are tilted down, the front end of the ship will be forced downwardly and the rear end will be forced upwardly, and vice versa when the elevators are tilted up. The principal function of these elevators is to keep the ship on a level keel.

At 27 I show a vertical rudder pivotally mounted at 28 and having a tiller handle 29 which is controlled as shown diagrammatically in Figure 8. A cable 31 has its ends secured in an eye 32 of the tiller handle, and the cable passes around pulleys 33 and 34, and continues around a sheave 36 and pulleys 37 and 38. The latter pulleys are located in the cockpits 22 at the opposite sides of the passenger deck, the deck being used to support the sheave 36. This structure affords a three point control for the rudder 27. An elevator in either cockpit can thus control the rudder 27 by actuating the proper pulley, or this may be accomplished by a pilot stationed in a cabin on the deck 11. It will also be understood that elevators 12 and 14 may be manipulated from either cockpit, the levers 17 and 26 and the manually-operated levers 19 and 19' being provided in duplicate.

At 41 I show circular bands, the edges of which are presented to the wind so as to offer as little resistance as possible in flight, and to these bands are secured various parts of the vehicle. Bands 41 are supported by struts as indicated at 42. The bands are provided with bearings 43 which rotatably support transverse rods 44. The planes or wings 46 are rigidly attached to the ends of the rods 44 and are actuated thereby.

I prefer in my invention to use a plurality of wings as shown in Figure 1, these wings being in tandem formation with one in rear of the other, and one set on each side of the passenger deck. This leaves an open space on the deck 11 for cabin purposes. The pivotal mounting of the wings permits them to be rotated into the dotted lines in Figures 2 and 5. This is accomplished by means of cables 47 and 48, the cables being wrapped several turns around revolvable shafts 49 that extend lengthwise of the ship. These cables are wrapped from opposite sides of the shafts 49 in the manner shown in Figure 6. When the shafts are rotated, one of the cables pays out and the other is gathered in, and this tilts the planes 46 on their pivots.

Since the rods 44 extend the width of the ship through both sets of planes, it will be seen that an aviator in either cockpit may adjust the angular position of the planes relative to the deck 11 by rotating a hand wheel 51, which in turn rotates a sprocket 52 having a chain 53 passing therearound and operatively connected to a second sprocket 54 on the shaft 49.

At 56 I show engines having propellers 57, one of these engines being shown for each of the planes 46. These engines are so cradled as to permit their being tilted and used as helicopters when necessary. For example, the two center propellers may be used as helicopters while the others are tilted forward, or the four rear propellers may be used as helicopters and the two forward ones tilted forward.

The showing of conventional parts is diagrammatic, and it will be understood that various changes or modifications may be made within the scope of the appended claims without departing from the spirit of the invention.

I claim:—

1. An aeroplane comprising a fuselage, sets of supporting planes swingably carried thereby and mounted to turn on substantially their transverse centers, each set comprising a plurality in tandem relation, and means for adjusting the angularity of the planes in unison, consisting of a rotatable member for each set of planes, means connecting the planes of each set adjacent to their leading and trailing edges with their respective rotatable member for swinging the planes as the member is rotated, and means interconnecting the rotatable members for causing them to rotate in unison.

2. An aeroplane comprising a fuselage having a deck portion, circular bands arranged on the deck, revolvable rods extending diametrically across the bands and projecting on opposite sides of the fuselage, supporting planes attached to the ends of the rods, struts leading over the tops of the bands and secured to the outer ends of the planes, and means for adjusting the angularity of the planes with respect to the deck.

VEZINO DE VEZINO.